United States Patent
Blandy

(10) Patent No.: US 7,149,870 B2
(45) Date of Patent: Dec. 12, 2006

(54) ASSIGNING SECTIONS WITHIN A MEMORY HEAP FOR EFFICIENT GARBAGE COLLECTION OF LARGE OBJECTS

(75) Inventor: Geoffrey Owen Blandy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 10/862,138

(22) Filed: Jun. 4, 2004

(65) Prior Publication Data

US 2005/0273567 A1 Dec. 8, 2005

(51) Int. Cl.
*G06F 12/00* (2006.01)

(52) U.S. Cl. .................. 711/173; 711/166; 711/170; 711/159; 707/206

(58) Field of Classification Search .............. 707/206; 711/159, 166, 170
See application file for complete search history.

(56) References Cited

U.S. PATENT DOCUMENTS

| | | | | |
|---|---|---|---|---|
| 6,070,173 A | 5/2000 | Huber et al. | ................ | 707/206 |
| 6,148,310 A | 11/2000 | Azagury et al. | ............ | 707/206 |
| 6,173,294 B1 | 1/2001 | Azagury et al. | ............ | 707/206 |
| 6,226,653 B1 | 5/2001 | Alpern et al. | ................ | 707/206 |
| 6,289,360 B1 | 9/2001 | Kolodner et al. | ........... | 707/206 |
| 6,317,756 B1 | 11/2001 | Kolodner et al. | ........... | 707/206 |
| 6,324,631 B1 * | 11/2001 | Kuiper | ...................... | 711/170 |
| 6,393,440 B1 | 5/2002 | Salant et al. | ................ | 707/206 |
| 6,434,575 B1 | 8/2002 | Berry et al. | ................ | 707/206 |
| 6,457,023 B1 | 9/2002 | Pinter et al. | ................ | 707/206 |
| 6,470,361 B1 | 10/2002 | Alpern et al. | ................ | 707/206 |
| 6,490,599 B1 | 12/2002 | Kolodner et al. | ........... | 707/206 |
| 6,510,440 B1 | 1/2003 | Alpern et al. | ................ | 707/206 |
| 7,010,555 B1 * | 3/2006 | Blandy et al. | .............. | 707/206 |
| 2002/0055941 A1 | 5/2002 | Kolodner et al. | ........... | 707/200 |
| 2003/0009547 A1 | 1/2003 | Benfield et al. | ............ | 709/223 |
| 2003/0220952 A1 | 11/2003 | Borman et al. | ............. | 707/206 |
| 2005/0273568 A1 | 12/2005 | Blandy | | |
| 2005/0278487 A1 | 12/2005 | Blandy | | |
| 2006/0064564 A1 | 3/2006 | Achanta et al. | | |

FOREIGN PATENT DOCUMENTS

| GB | 2 345 159 A | 6/2000 |
|---|---|---|
| GB | 2 345 160 A | 6/2000 |

OTHER PUBLICATIONS

Wilson, Paul R., "Uniprocessor Garbage Collection Techniques", pp. 1-66, 1994.*
Dimpsey et al, "Java Server Performance: A case study of building efficient, scalable JVMs", IBM Systems Journal, vol. 39, No. 1, 2000, pp. 151-174.

* cited by examiner

*Primary Examiner*—Reba I. Elmore
(74) *Attorney, Agent, or Firm*—Marilyn S. Dawkins; Amy J. Pattillo

(57) ABSTRACT

A method, system, and program for assigning sections within a memory heap for efficient garbage collection of large objects are provided. A first portion of a memory heap is distributed among a first number of sections from among multiple sections, wherein the first number of sections correspond to a number of helper threads allocable for bitwise sweeping of the memory heap during garbage collection. A section portion of the memory heap is distribution among a second number of sections, wherein a size of the memory heap distribution of the second number of sections progressively decreases, such that the total number of sections within the memory is minimized, but any disparity between each of the helper threads completing sweeps of all the sections is reduced.

17 Claims, 5 Drawing Sheets

ASSIGNING SECTIONS WITHIN A MEMORY HEAP FOR EFFICIENT GARBAGE COLLECTION OF LARGE OBJECTS

CROSS-REFERENCE TO RELATED APPLICATION

The present application is related to the following co-pending application:

(1) U.S. patent application Ser. No. 10/862,137.

BACKGROUND OF THE INVENTION

1. Technical Field

The present invention relates in general to improved garbage collection and in particular to improved efficiency in handling large objects during garbage collection. Still more particularly, the method, system, and program of the present invention provides improved distribution of the memory heap among sections for efficient parallel bitwise sweep of larger objects during garbage collection.

2. Description of the Related Art

Software systems, such as the Java Virtual Machine (JVM), that employ garbage collection typically provide an explicit call for allocating objects, but no explicit call for freeing objects. Instead, in a system that employs garbage collection, when available storage on a heap is exhausted, all operations are suspended and garbage collection is invoked to replenish the free storage.

A common garbage collection algorithm is called "mark and sweep". During the mark phase, all Java objects that are still accessible to a program are identified and marked. Next, during the sweep phase, unmarked objects of the heap are identified as free space. In particular, free space is typically identified as the space bounded by marked objects or by the beginning or end of the heap.

In particular, during the sweep phase, the free spaces that are of a sufficiently large size are considered free items that may be arranged into lists or structures that facilitate subsequent object allocation. Any free memory fragments that are not of sufficient large size are deemed unnecessary and are not included in the list.

In sweep phrase implementation, it is common for a garbage collection algorithm to require that the size of objects currently within the heap be derivable from an examination of the object. Additionally, some garbage collection algorithms may require that free memory fragments have a derivable size.

One approach for facilitating object and fragment size derivation is to include a prefix to every object and fragment, where the prefix indicates a size field. Another approach for facilitating object and fragment size derivation is by implementing a bitwise sweep algorithm. To implement a bitwise sweep algorithm, a dedicated bit array that is independent of the heap identifies marked objects where each bit represents a fixed storage size (e.g. 8 bytes) and each object is aligned to this size. At the onset of the mark phase, the dedicated bit array is cleared. Then, referenced objects are marked by setting the bit that represents the starting location of the object. Next, during the sweep phase, the bitwise sweep algorithm is implemented by scanning the dedicated bit array, searching for runs of zero bits bound on each side by marked bits. When a sufficiently large run of zeroes bound by marked bits is located, the object at the beginning of the run is examined and its size fetched. The size of the initial marked object is then subtracted from the size represented by the run of zeroes and if the resulting size is sufficiently large, the storage bound by the marked objects is considered a free item and is saved in a way to allow it to be used for subsequent object allocation.

Garbage collection becomes more complex in a multi-processor system. In particular, a parallel garbage collector may be implemented to handle garbage collection in a multiprocessor system. A parallel garbage collector may implement sufficient helper threads to use all the available processors during garbage collection. In one example of an implementation of a parallel sweep phase, the heap may be divided among multiple sections so that each helper thread can work on unique sections and not impede the other helper threads.

When all sections have been processed by helper threads, the helper threads are suspended and the garbage collector enters single thread mode. In single thread mode, a single thread examines all the section data and may identify free items that span sections. The single thread arranges all the identified free items into appropriate structures for subsequent allocations. In particular, during single thread mode, all other threads of the Java process are suspended and only one process is used by the Java process.

When a Java application is run on a multiprocessors system, it is important that parallel garbage collectors are as efficient as possible. First, it is important to make helper threads function as efficiently as possible because when the helper threads are executing on the multiple processors, the Java application threads are suspended. In particular, it is important to have helper threads finish sweeping all sections close to the same time to reduce the amount of time that processors remain idle waiting for other helper threads to finish. Second, it is important to make the single thread mode runtime as short as possible because when the single thread executes during single thread mode, all other Java threads are suspended.

The bitwise sweep algorithm is one efficient method of facilitating sweeps when objects are small, but the current bitwise sweep algorithm is inefficient when used to facilitate object size derivation for large objects, and in particular large objects that are significantly larger than the size requirement for addition to a free list. For example, large database applications and applications that display images may instantiate objects that are several megabytes in size, while the typical free list may only require unmarked objects to be several hundred bytes to be eligible for storage in a free list. Under the current bitwise sweep, each bit representing the length of the initial marked object must be scanned and a marked bit reached before the size of the object is fetched. Thus, the current bitwise sweep algorithm is inefficient because if the size of the fetched object is large, many bits are unnecessarily scanned.

In allocating sections, multiple small sections may be allocated to promote sweep efficiency. In particular, when there are multiple small sections, the time that helper threads sweep each section is reduced, allowing the helper threads to complete sweeping all the sections more closely to each other. However, as the number of small sections increases, the amount of time required for single thread mode increases, which may effectively decrease the efficiency gained from allocating multiple small sections. In addition, while allocating multiple small sections may promote efficient sweeps of small objects, sweeping multiple small sections for larger objects is inefficient. In particular, when a larger marked object extends across multiple small sections, in a bitwise sweep, each bit of each portion of the larger object is inefficiently scanned within each section.

Therefore, in view of the foregoing, there is a need for a method, system, and program for improving the efficiency of bitwise sweeps in a parallel garbage collector and the efficiency of section dispersal to improve the efficiency of handling larger objects, and in particular for handling objects that are substantially larger than the size required for addition of the object to the free list.

SUMMARY OF THE INVENTION

Therefore, an improved method, system, and program provide improved garbage collection and in particular provide improved efficiency in handling large objects during garbage collection. Still more particularly, the method, system, and program of the present invention provides improved distribution of the memory heap among sections for efficient parallel bitwise sweep of larger objects during garbage collection.

According to one aspect, a first portion of a memory heap is distributed among a first number of sections from among multiple sections, wherein the first number of sections correspond to a number of helper threads allocable for bitwise sweeping of the memory heap during garbage collection. A section portion of the memory heap is distribution among a second number of sections, wherein a size of the memory heap distribution of the second number of sections progressively decreases, such that the total number of sections within the memory is minimized, but any disparity between each of the helper threads completing sweeps of all the sections is reduced.

According to another aspect, the disparity between completion times of the helper threads sweeping all the sections is monitored. If the disparity between completion times is within an acceptable disparity range, then the current section distribution is maintained. If the disparity between completion times is less than the acceptable disparity range, then the size of the first portion of the memory heap may be increased and the first number of sections and second number of sections adjusted in size and the second number of sections adjusted in number, if necessary. If the disparity between completion times is greater than the acceptable disparity range, then the size of the first portion of the memory heap may be reduced so that additional smaller sections can be distributed within the second portion of the memory heap.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
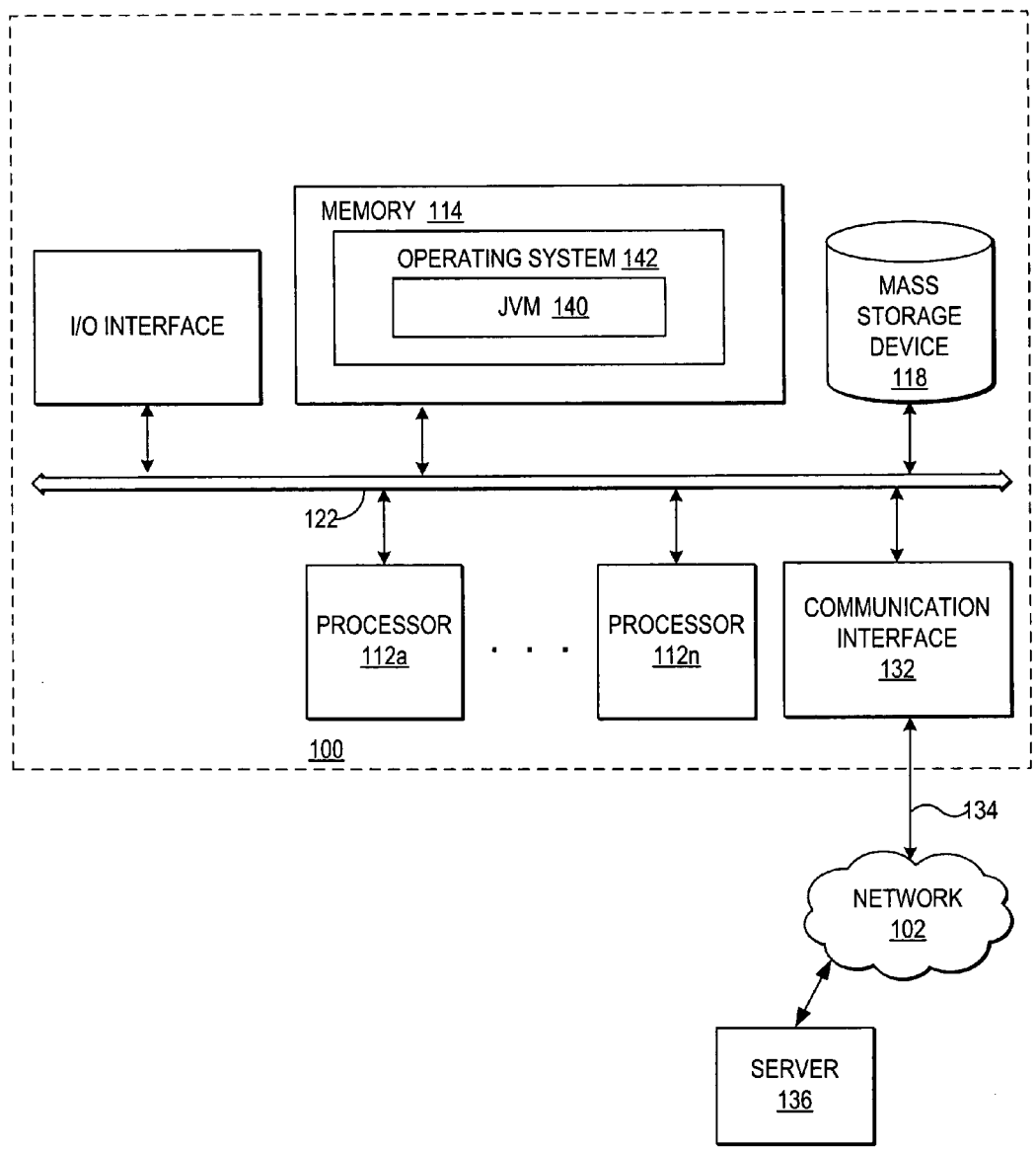
FIG. 1 is a block diagram depicting one embodiment of the hardware and software implemented in a computer system through which the present method, system, and program may be implemented.

Referring now to the drawings and in particular to FIG. 1, there is depicted one embodiment of the hardware and software implemented in a computer system through which the present method, system, and program may be implemented. The present invention may be executed in a variety of systems, including a variety of computing systems and electronic devices.

Computer system 100 generally includes a bus 122 or other communication device for communicating information within computer system 100, and at least one processing device, such as processor 112a, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors, such as processors 112a–112n that operate in parallel to improve network servicing power.

Processors 112a–112n may be general-purpose or specified purpose processors that, during normal operation, operate under the control of one or more of a number of different operating systems, such as operating system 142, and execute various computer software applications, programs, objects, modules and other processes from a memory 114. Although not depicted, memory 114 may include dynamic storage such as random access memory (RAM) and static storage such as Read Only Memory (ROM). In addition, although not depicted, each of processors 112a–112n may include levels of cache and registers local to a central processing unit.

In one embodiment, a Java Virtual Machine (JVM) 140 is loaded in memory on top of operating system 132. JVM 140 appears as an application to (native) operating system 142, but in fact functions as a virtual operating system, supporting Java applications. In particular, Java applications are preferably portable applications that when run by JVM 140, can run on any platform, regardless of operating system or hardware specifications. Although not depicted, JVM 140 compiles byte code from Java applications and a Java interpreter converts the byte code into instructions understandable by operating system 142. The components of JVM 140 may be incorporated into a standalone application, a part of an operating system, or a part of a larger application, such as a browser application or middleware. In an alternate embodiment, JVM 140 and any of the components of JVM 140 may, at different times, be resident in whole or in part in any of memory 114, mass storage device 118, network 102, or within registers or cache of processors 112a–112n or other processor registers and cache.

Figure 4:
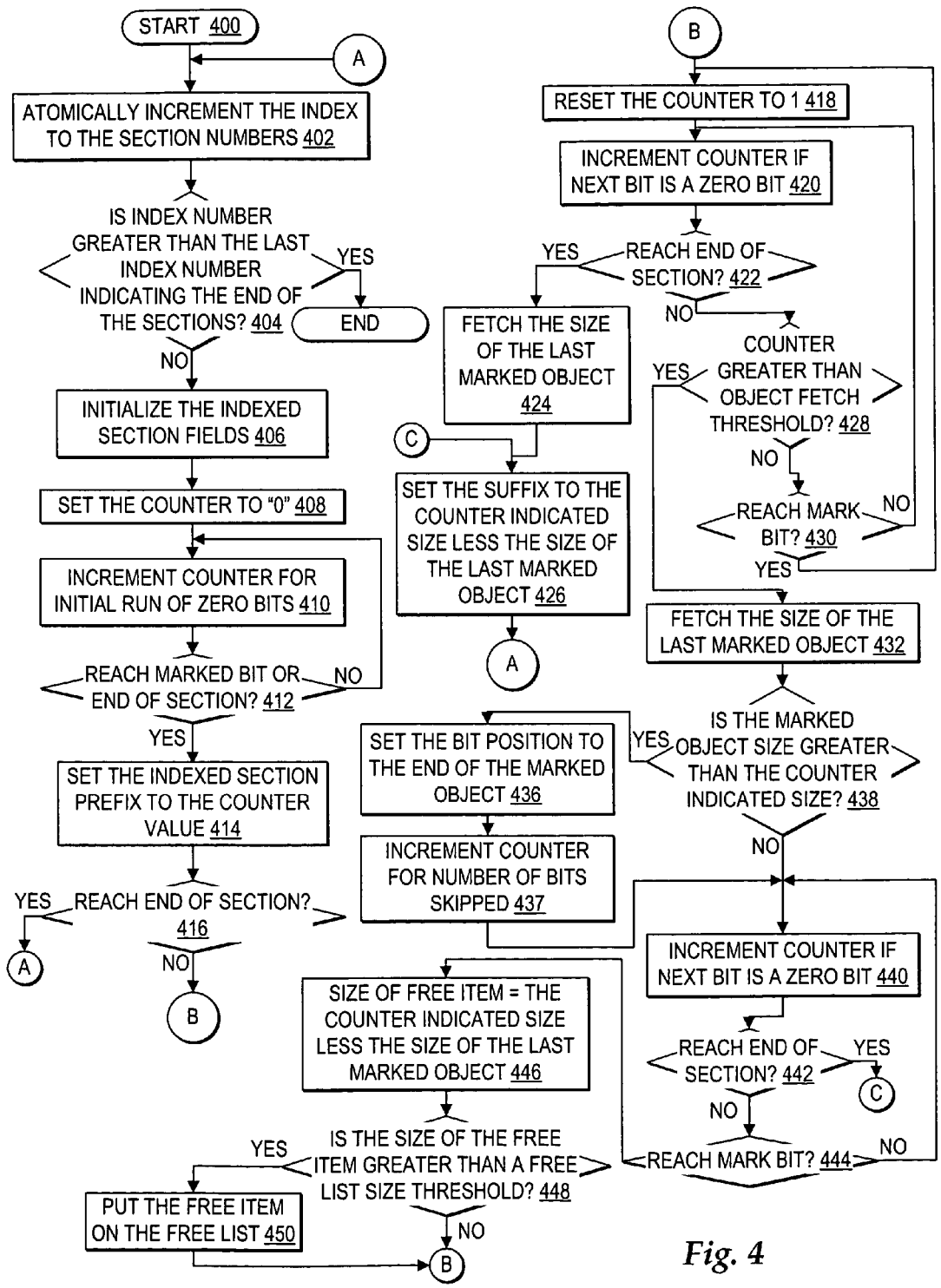
FIG. 4 is a high level logic flowchart depicting a process and program for performing a parallel bitwise sweep in accordance with the method, system, and program of the present invention.
Figure 5:
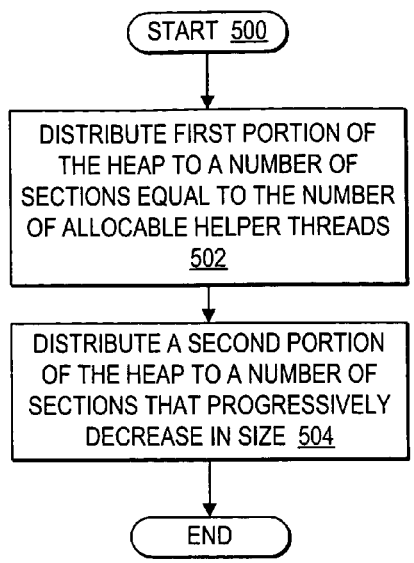
FIG. 5 is a high level logic flowchart depicting a process and program for initially distributing sections within a memory heap for efficient sweeps of larger objects in accordance with the method, system, and program of the present invention.
Figure 6:
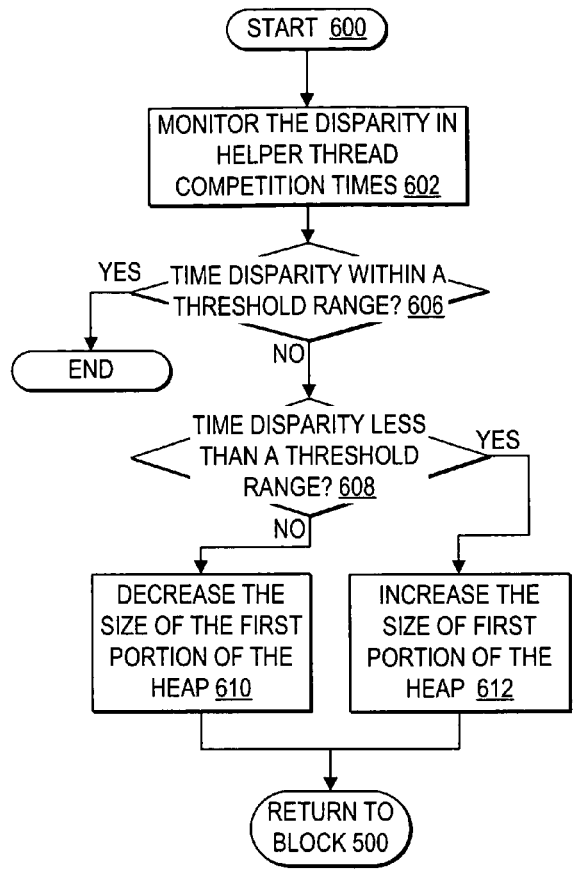
FIG. 6 is a high level logic flowchart depicting a process and program for managing the distribution of sections within a memory heap for efficient sweeps of larger objects in accordance with the method, system, and program of the present invention

In one embodiment, operating system software or JVM 140 contains machine executable instructions that when executed on processor 112 carry out the operations depicted in the flowchart of FIGS. 4, 5, and 6, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processors 112a–112n or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote system, such as a server 136, to requesting computer system 100 by way of data signals embodied in a carrier wave or other propagation medium via a network link 134 (e.g. a modem or network connection) to a communications interface 132 coupled to bus 122. Communications interface 132 provides a data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

In addition to server 136, any number of computers and other devices may be networked through network 102. Further, operating system 142, JVM 140, and various applications, programs, objects, modules and other processes may execute on one or more processors in server 136 and other computer systems accessible via network 102 in a distributed environment. In particular, when implemented as a server system, computer system 100 typically includes multiple communication interfaces accessible via multiple peripheral component interconnect (PCI) bus bridges connected to an input/output controller. In this manner, computer system 100 allows connections to multiple networked accessible computers.

In addition, computer system 100 typically includes multiple peripheral components that facilitate communication. These peripheral components are connected to multiple controllers, adapters, and expansion slots coupled to one of the multiple levels of bus 122 and herein referred to by I/O interface 130.

Those of ordinary skill in the art will appreciate that the hardware depicted in FIG. 1 may vary and can be implemented within multiple types of systems. For example, computer 100 can be a standard computer or server, but can also be an embedded system, such as a set top box, handheld device, or any other hardware device including a processor and JVM 140. Furthermore, those of ordinary skill in the art will appreciate that the depicted example is not meant to imply architectural limitations with respect to the present invention.

Figure 2:
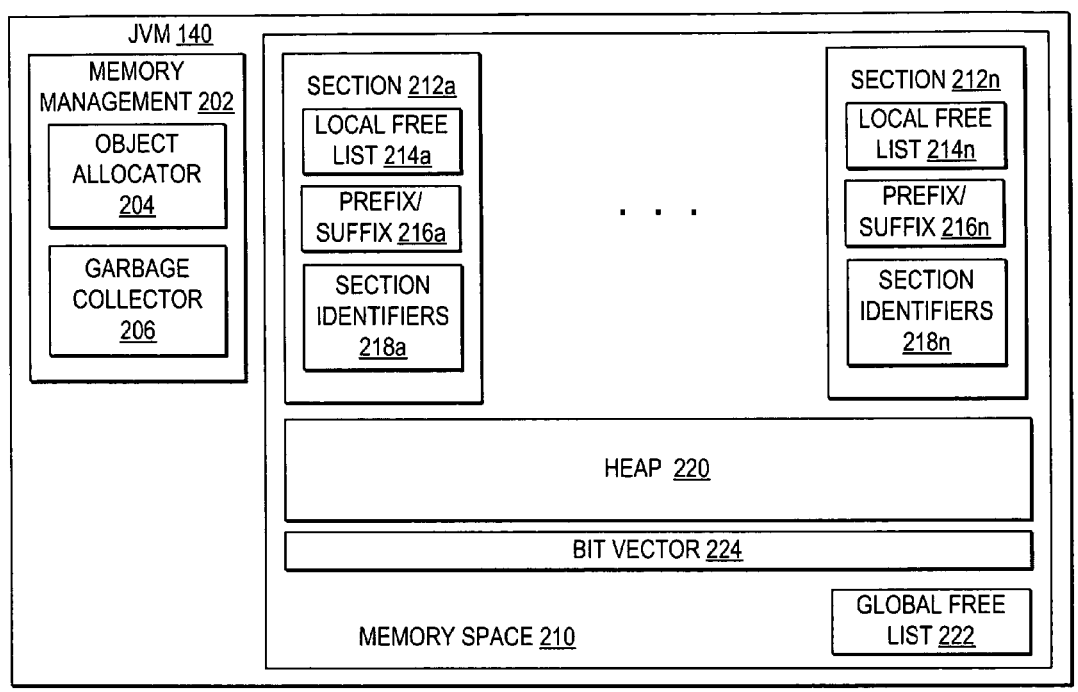
FIG. 2 is a block diagram depicting a block diagram of the memory management and allocation within a JVM in accordance with the method, system, and program of the present invention.

With reference now to FIG. 2, a block diagram depicts a block diagram of the memory management and allocation within a JVM in accordance with the method, system, and program of the present invention. As depicted, JVM 140 includes a memory management controller 202, in addition to interpreters, controllers, and other components not depicted, but typically implemented within a JVM.

Initially, memory management controller 202 requests memory space 210 from the operating system for storing objects and data for a Java application. In the embodiment depicted, memory management controller 202 is a component of JVM 140, however it will be understood that memory management controller 202 may be located within other software systems.

In one embodiment, memory space 210 includes is a contiguous block of memory, called the heap. Same sized blocks of heap 220 are represented by bits in an independent bit vector 224. For example, 8-byte blocks of heap 220 may each be represented by a bit in independent bit vector 224.

In this example of a multiprocessor system, portions of heap 220 are assigned among multiple sections 212a–212n. In particular, each of sections 212a–212n is represented by a data structure that including section identifiers 218a–218n that identify the portions of heap 220 and bit vector 224 assigned to each section. In addition, the data structures representing each of sections 212a–212n include local free lists 214a–214n and prefix and suffix fields 216a–216n.

Memory management controller 202 includes an object allocator 204 and a garbage collector 206. Object allocator 204 controls the allocation of heap space to objects needed for execution of a Java application. Garbage collector 206 controls the deletion of objects from memory space 210 when those objects are no longer required. In particular, an advantage of the Java programming language is that Java applications do not need to specifically control the allocation or deallocation of memory, rather the allocation and deallocation of memory is controlled by JVM 200.

When a request for object allocation is received by JVM 200, object allocator 204 searches a global free list 222 for a free item providing sufficient allocation space for the new object. Global free list 222 and local free lists 214a–214n may include, for example, a linked list of free items within heap 220.

When global free list 222 is searched, if a free item providing sufficient allocation space is located, in one example, the free item is popped from global free list 222 and the new object is allocated within the space previously occupied by the free item. If a free item providing sufficient allocation space is not available, in one example, garbage collection is initiated to free up additional heap space.

Garbage collector 206 may perform garbage collection using mark and sweep phases, for example. During a mark phase, objects that are still actively referenced in heap 220 are identified and the bit in a bit vector 224 that corresponds to the first byte of each referenced object is marked.

Next, during garbage collection, in a phase commonly referred to as the "sweep phase", sufficient helper threads are initiated to use all of the available processors. Each of the helper threads may perform an atomic operation to acquire the next unprocessed section from among sections 212a–212n and efficiently identify free space. In particular, as will be described in detail with reference to FIG. 3, each helper thread scans the portion of the bit array assigned to an acquired section to locate the first marked bit. If no marked bit is found, then the prefix value is set to the number of bits in the portion of the bit array and the next section, if any, is acquired. If a marked bit is found, the number of preceding zero bits are stored in the prefix field of the section data structure. Next, the helper thread counter is reset and then incremented for each zero in a consecutive sequence following the marked bit. If the counter value exceeds an object fetch threshold, then the size of the marked object is fetched and the size indicated by the counter bits is subtracted from the size of the marked object. If the marked object size exceeds the size indicated by the counter bits, then the remainder of the bits representing the marked object are skipped and any consecutive sequence of zero bits following the marked object bits are counted, indicating potentially free space. Advantageously, by fetching the size of a marked object once the marked object represents a potentially larger marked object, not all the bits of a larger marked object need be scanned.

Once the end of the section or a marked bit is detected, if a consecutive sequence of zero bits exceeds a free list size threshold, then the sequence of zero bits is considered a free item and added to the local free item list. Further, in particular, when the end of the section is reached, the size indicated by the current counter is subtracted from last marked object size and the value is stored in the suffix field of the section's data structure. In one example, the suffix value will be a zero if the object ends at the boundary, negative if the object extends beyond the boundary, or positive if there is free storage at the end of the section.

Once all the helper threads complete the sweep of local heaps 218a–218n, garbage collector 206 acquires a lock on execution by any other Java processes and executes a single thread. The single thread collects all the free items stored in local free lists 214a–214n and combines local free lists 214a–214n into a single global free list 222. In addition, the single thread collects all the prefix/suffix values 216a–216n and identifies free items of sufficient size for the free list that overlap sections.

As will be further described with reference to FIG. 3, when heap 220 is initially defined, the number of sections and the size of the heap represented in each section may be defined to make allocation and deallocation of large objects more efficient. In particular, in one example, the first portion of the heap may be assigned among "n" larger sections, where "n" represents the number of helper threads. In particular, the size of each portion of the heap assigned among the "n" larger sections may be set such that when a bitwise scan for consecutive sequences of zeroes of a length indicating a potentially free item is performed during the sweep phase, large marked objects are quickly identified and skipped to decrease the performance time for each helper thread in identifying free items. A second portion of the heap assigned among sections is divided into multiple sections that progressively decrease in size. In particular, the number of progressively decreasing smaller sections may be allocated such that there is a sufficient pool of small sections assigned to the end of the heap to ensure proper thread load balancing, but minimize the overall number of sections required. Overall, by assigning "n" large sections from among one portion of the heap and then assigning multiple progressively smaller sections from among a second portion of the heap, the overall number of required sections is reduced, but efficient handling of large objects is promoted. In particular, when the number of sections is reduced, the amount of time utilized by the single mode thread is reduced which increases the efficiency of garbage collector 206.

Figure 3:
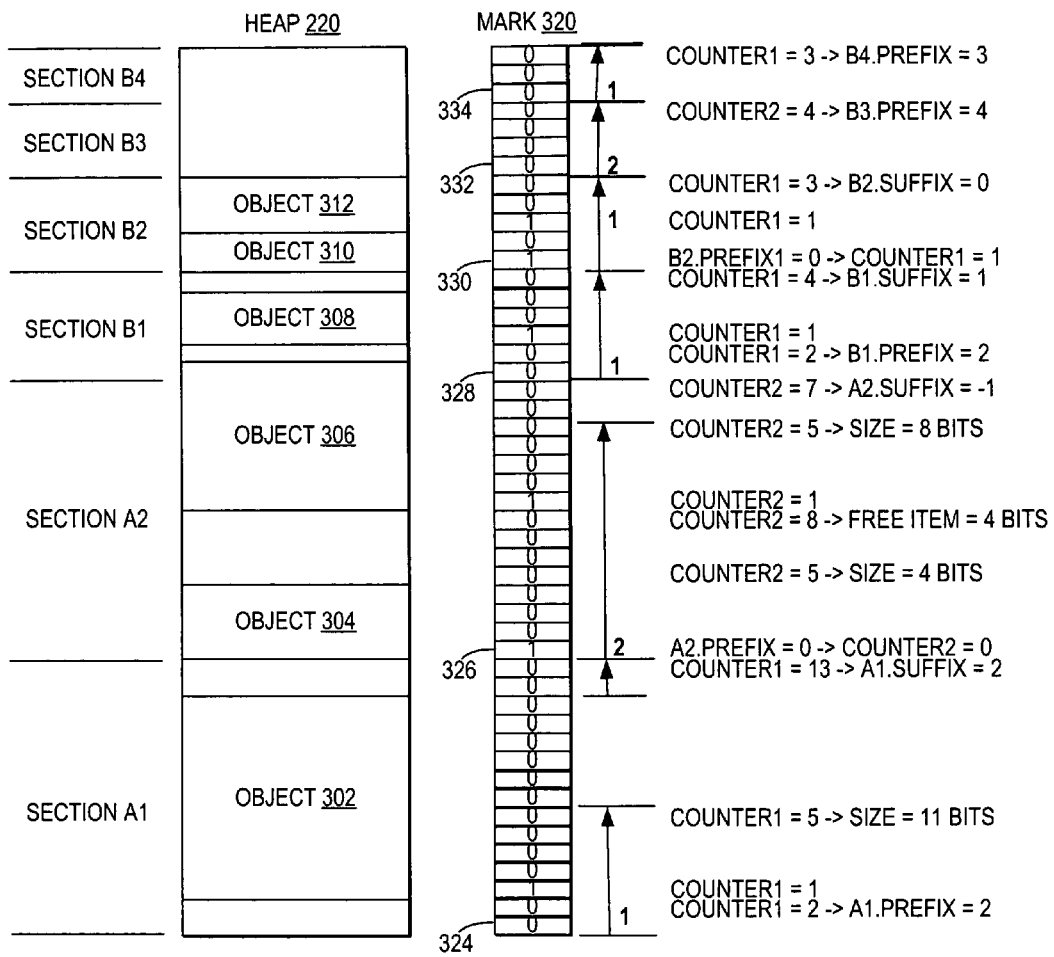
FIG. 3 is an illustrative example depicting an efficient parallel bitwise sweep in accordance with the method, system, and program of the present invention.

Referring now to FIG. 3, an illustrative example depicts an efficient parallel bitwise sweep in accordance with the method, system, and program of the present invention. As depicted in the example, portions of heap 220 are divided among multiple sections.

In particular, in the example, heap 220 is logically divided into multiple sections delineated as sections A1 and A2 and sections B1–B4. The first portion of heap 220 is distributed among sections A1 and A2, where there are two helper threads available and thus two sections designated for a first portion of heap 220. The second portion of heap 220 is distributed among the data structures for sections B1–B4, where the portion of the heap allocated among each of these sections progressively decreases in size. In the example, the first portion of heap 220 is a little over half of heap 220, however, the size of the first portion of heap 220 may be adjusted responsive to recent disparity in the completion times of helper threads.

For purposes of example, heap 220 includes multiple marked objects 302, 304, 306, 308, 310 and 312. In the figure, the bottom of memory heap 220 represents the address at the start of the heap and the top of the heap represents the end of the heap. In addition, as depicted in the figure, objects allocated within heap 220 may vary in size, however, all objects allocated within heap 220 start on an 8-byte boundary. It will be understood that other sizes of byte boundaries may also be implemented.

In one embodiment, the location of the first byte of each marked objected within heap 220 is depicted by a corresponding bit set in mark vector 320. In particular, mark vector 320 is a bit vector with one bit to represent each 8-byte section of heap 220. During the mark phase, bits are set corresponding to the 8-byte section at the start of each object that is live. In one example, a live object is one that is still referenced by other objects, however other rules may be set for marking live objects. For purposes of example, only marked objects are depicted within heap 220, however heap 220 may also include unmarked objects, as well previously discarded free items.

After the mark phase, a sweep phase identifies and places free space that is larger than a free list size threshold on a free item list or some other structure to facilitate subsequent object allocation. To find free spaces larger than a free list size threshold, the garbage collector performs a bitwise sweep of mark vector 320. In general, during the bitwise sweep, mark vector 320 is scanned for a marked bit followed by a run of zeroes that exceed an object fetch threshold. Once a marked bit followed by a run of zeroes that exceed an object fetch threshold is identified, the size of the marked object is fetched. If the fetched object size is greater than the size indicated by the run of zeroes, then the remaining bits corresponding to the object are skipped and the scanning resumes with the bit following the marked object or terminates if the object extends beyond the end of a current section. If the scanning resumes, then the zeroes following the marked object bits are counted and identified and placed on the free item list if the free item represented by the counted zeroes is greater than the free list size threshold.

It is important to note that the object fetch threshold may be adjusted to optimize skipping over portions of large marked objects. In one example, object fetch threshold may be set to a value calculated by adding the smallest possible object sized to the free list size threshold, where free items greater than the free list size threshold are placed on the free list. For purposes of the example only, represented in terms of bit vector sized bits, the object fetch threshold is set to 4 bits, where the free list size threshold is 3 bits and the smallest possible object size is 1 bit.

In particular, since heap 300 is logically allocated into sections, one of multiple helper threads performs the bitwise sweep within each section. In particular, in the example, during a bitwise sweep, helper threads, identified as helper threads 1 and 2, initially acquire sections A1 and A2 and begin sweeping portions of mark vector 320 as illustrated at reference numerals 324 and 326.

When a helper threads begins scanning a section, the helper thread begins counting the initial number of zeroes in a consecutive sequence. A counter implemented by each helper thread is incremented for each consecutive zero scanned. When a marked bit or the end of the section is reached, then a prefix for the section is set to the counter value. In addition, if the end of the section is reached, then the helper thread terminates and acquires the next section data structure. In the example, the prefix for section A1 is set to 2 and the prefix for section A2 is set to 0 to represent the number of consecutive zero bits counted before reaching the first marked bit in each section. In addition, in the example, the prefixes for section B3 and B4 are set to 4 and 3, respectively, indicating empty sections because the prefix value equals the number of bits for the section. By setting the prefix for each section, when the results of each helper thread sweep are combined from the section data structures, the main thread can easily combine free space that extends across sections to determine if the free space is sufficient in size to be a free item on the global free list.

If a marked bit is reached while scanning an initial sequence of zero bits, then the counter is reset to "1" and the helper thread continues to increment the counter for each consecutive zero bit scanned. If the counter exceeds an object fetch threshold, then the size of the initially marked object is fetched. If the size of the initially marked object is greater than the size indicated by the counter bits, then the remaining bits identifying the marked object are skipped and the counter is incremented by the number of skipped bits. When the end of the section or another marked bit are reached, then the size of a free item is determined by subtracting the last marked object size from the size indicated by the counter.

In the example of the scan of section A1, helper thread 1 resets the counter to "1" when the first marked bit is reached and increments the counter for each consecutive zero scanned until the counter reaches "5", which exceeds the object fetch threshold. The size of marked object 302 is fetched; the size of marked object is represented by 11 bits. Since the size of the marked object exceeds the counter indicated size, the remaining six bits of marked object 302 are skipped and the counter is automatically incremented by the number of remaining bits. The jump in bit position is illustrated by the helper thread scan discontinuing for the skipped bits. Next, the helper thread continues to scan the bits and increment the counter for zero bits. When the end of section A1 is detected, the suffix for section A1 is set to the size of marked object 302 subtracted from the counter indicated size. It is important to note that by skipping bits of marked object 302, the helper thread more efficiently scanned section A1 than if each bit of marked object 302 had been scanned.

Once helper thread 1 completes the sweep of section A1, helper thread 1 then acquires a next section, which in the example is section B1, and starts scanning portion of the bit vector assigned to section B1 at the bit indicated at reference numeral 328. The prefix for section B1 is set to indicate the number of zero bits scanned before a marked bit is reached and the counter is reset to "1". When the end of section B1 is detected, since the counter has not yet exceeded the object fetch threshold, the size of marked object 308 is fetched and subtracted from the counter indicated size to determine the suffix value for section B1 of "1".

Next, helper thread acquires section B2 and begins scanning the portion of the bit vector assigned to section B2 at the bit indicated at reference numeral 330. There are no zero bits before first marked bit reached in section B2, so the prefix for B2 is set to "0" and the counter is set to "1". The counter is reset to "1" when the next marked bit is reached. Advantageously, the size of marked object 310 need not be fetched because the object fetch threshold was not exceeded, and thus it is not possible for a marked object and free item of sufficient size to be represented by the consecutive sequence of zeroes. At the end of the section, the counter is set to "3", the size of marked object 312 is fetched, which is represented by 3 bits so the suffix for section B2 is set to "0".

Helper thread 2 may begin execution concurrently with helper thread 1, and acquire section A2. In the scan of the portion of the bit vector assigned to section A2, as depicted starting at reference numeral 326, the initial bit is a "1", so the prefix for section A2 is set to "0". The counter is set to "1" and is incremented for each consecutive zero. In this example, the counter exceeds the object fetch threshold and the size of marked object 304 is fetched; the size for marked object 304 is represented by 4 bits. The size of the marked object does not exceed the counter indicated size, so the thread continues to increment the counter for each consecutive zero bit. When a marked bit is reached, the size of a free item is determined. In particular, when the second marked bit is reached in the scan of section A2, the counter has reached "8" and the size of the previous marked object has already been fetched, so a 4 bit free item is identified and because the free item exceeds to the 3 bit free list size threshold the free item is added to section A2's local free list. The counter is then reset to "1" and the counter is incremented for each consecutive zero bit detected until the counter reaches the object fetch threshold again. This time, the size of marked object 306 is fetched and the helper thread determines that since the marked object size exceeds the counter indicated size by 2 bits, the last 2 bits representing marked object 306 can be skipped. In addition, since marked object 306 crosses into section B1, the suffix for A2 is set to indicate the additional size of marked object 306 outside section A2.

Helper threads 1 and 2 end by scanning sections B4 and B3, respectively. It will be understood that additional smaller sections may be added within the section portion of the heap. In particular, if the disparity between the completion times of the helper threads exceeds an acceptable disparity range, then the second portion of the heap may be increased in size and additional smaller sections added.

It is important to note that while the present invention has been described with reference to a helper thread that scans each bit, helper threads may alternatively grab a series of bits and quickly determine if all the bits in the series are zero bits. In addition, other code level techniques may be used that increase the efficiency of scanning consecutive sequence of zero bits.

As depicted, to improve the efficiency of sweeps of large objects, it is important to fetch the size of potentially large marked objects, so that if the marked object exceeds the object fetch threshold, the remainder of the bits representing the marked object in the bit vector can be skipped. In addition, however, it is important to provide sections large enough to hold objects larger than the object fetch threshold, such that the time savings of prematurely fetching the size of a marked object and skipping remaining bits can be used.

While, the present embodiment illustrates a bitwise sweep method and memory allocation for improved garbage collection efficiency when the heap includes larger objects, smaller objects are also efficiently added to a free list or discarded to improve the overall efficiency. In particular, the size assignments of sections B1–B4 illustrate the advantage of having multiple smaller sections following the larger sections to reduce the disparity of time between each of the helper threads completing the sweep of a selection of the sections and to quickly sweep sections. As depicted, as the sizes of the portion of the heap assigned to each of sections B1–B4 decreases, the number of bits that can potentially be scanned in each section is reduced. In particular, advantageously, if the disparity between completion times of helper threads scanning the first portion of sections is large, the disparity may narrow as the sweep times decrease in sections B1–B5.

With reference now to FIG. 4, there is depicted a high level logic flowchart of a process and program for performing a parallel bitwise sweep in accordance with the method, system, and program of the present invention. As depicted, the process starts at block 400 and thereafter proceeds to block 402. Block 402 depicts automatically incrementing the index into the section numbers. Next, block 404 depicts a determination whether the index number is greater than the last index number indicating the end of the section. If the index number is greater than the last index number indicating the end of the sections, then the process ends. If the index number is not greater than the last index number indicating the end of the sections, then the process passes to block 406.

Block 406 depicts initializing the fields for the currently indexed section. Next, block 408 depicts setting a thread counter to "0". Thereafter, block 410 depicts incrementing the counter for each zero bit in an initial run of zero bits. Next, block 412 depicts a determination whether a marked bit or end of section bit is reached. If a marked bit or end of section is not yet reached, then the process returns to block 410. If a marked bit or end of section is reached, then the process passes to block 414. Block 414 depicts setting the indexed section prefix to the counter value, and the process passes to block 416.

Block 416 depicts a determination whether the end of the section is reached. If the end of the section is reached, then the process returns to block 402. If the end of the section is not reached, then the process passes to block 418.

Block 418 depicts resetting the counter to "1". Next, block 420 depicts incrementing the counter if the next bit detected in the mark array is a zero bit. Thereafter, block 422 depicts a determination whether the end of a section is reached. If the end of the section is reached, then the process passes to block 424. Block 424 depicts fetching the size of the last marked object. Next, block 426 depicts setting the suffix to the counter indicated size less the size of the last marked object, and the process returns to block 402. In one example, the counter indicated size may be calculated by multiplying the counter value times the grain size, such as 8 bytes. Alternatively, the size of the marked object may be represented in terms of bits.

Returning to block 422, if the end of the section is not reached, then the process passes to block 428. Block 428 depicts a determination whether the counter is greater than an object fetch threshold. If the counter is not greater than an object fetch threshold, then the process passes to block 430. Block 430 depicts a determination whether a marked bit is reached. If a marked bit is not reached, then the process returns to block 420. If a marked bit is reached, then the process returns to block 418.

Returning to block 428, if the counter is greater than an object fetch threshold, then the process passes to block 432. Block 432 depicts fetching the size of the last marked object. Next, block 434 depicts a determination whether the marked object size is greater than the counter indicated size. If the marked object size is greater than the counter indicated size, then the process passes to block 436. Block 436 depicts setting the bit position to the end of the marked object. Next, block 437 depicts incrementing the counter for the number of bits skipped, and the process passes to block 440. Otherwise, at block 438, if the marked object size is not greater than the counter indicated size, then the process passes to block 440.

Block 440 depicts increment the counter if the next bit is a zero bit. Next, block 442 depicts a determination whether the end of the section is reached. If the end of the section is reached, then the process passes to block 426. Otherwise, at block 442, if the end of the section is not reached, then the process passes to block 444. Block 444 depicts a determination whether a marked bit is reached. If a marked bit is not reached, then the process returns to block 440. If a marked bit is reached, then the process passes to block 446.

Block 446 depicts setting the size of the free item to the counter indicated size less the size of the last marked object. Next, block 448 depicts a determination whether the size of the free item is greater than a free list size threshold. If the size of the free item is not greater than the free list size threshold, then the process returns to block 418. Otherwise, at block 448, if the size of the free item is greater than the free list size threshold, then the process passes to block 450. Block 450 depicts putting the free item on the free list, and the process returns to block 418.

Referring now to FIG. 5, there is depicted a high level logic flowchart of a process and program for initially distributing sections within a memory heap for efficient sweeps of larger objects in accordance with the method, system, and program of the present invention. As depicted, the process starts at block 500 and thereafter proceeds to block 502. Block 502 depicts distributing a first portion of the heap to a number of sections equal to the number of allocable helper threads for garbage collection. Next, block 504 depicts distributing a second portion of the heap over a number a sections that progressively decrease in size, and the process ends. It is important to note that in distributing portions of the heap to sections, a data structure is created for each section that indicates the portion of the heap assigned to the section and the portion of the bit arrays assigned to each section. In addition, it is important to note that in distributing portions of the heap to sections, the size of the portion of the heap assigned to each of the sections in the first portion may reflect the object fetch threshold required for early fetching of a size of a marked object.

With reference now to FIG. 6, there is depicted a high level logic flowchart of a process and program for managing the distribution of sections within a memory heap for efficient sweeps of larger objects in accordance with the method, system, and program of the present invention. As depicted, the process starts at block 600 and thereafter proceeds to block 602. Block 602 depicts monitoring the disparity in helper thread completion times. Next, block 606 depicts a determination whether the time disparity is within a threshold range. If the time disparity is within a threshold range, then the process ends. If the time disparity is not within a threshold range, then the process passes to block 608. Block 608 depicts a determination whether the time disparity is less than a threshold range. If the time disparity is less than a threshold range, then the process passes to block 612. Block 612 depicts increasing the size of the first portion of the heap, and the process returns to block 500. Otherwise, at block 608, if the time disparity is not less than a threshold range, then the process passes to block 610. Block 610 depicts decreasing the size of the first portion of the heap, and the process returns to block 500.

While the invention has been particularly shown and described with reference to a preferred embodiment, it will be understood by those skilled in the art that various changes in form and detail may be made therein without departing from the spirit and scope of the invention.

What is claimed is:

1. A method for efficiently distributing a memory heap among a plurality of sections, comprising:
   distributing a first portion of a memory heap among a first number of sections from among a plurality of sections, wherein said first number of sections correspond to a number of a plurality of helper threads allocable for bitwise sweeping of said memory heap during garbage collection; and
   distributing a second portion of said memory heap among a second number of sections from among said plurality of sections, wherein a size of said memory heap distributed among each of said second number of sections progressively decreases, such that a total number of sections within said memory heap is minimized and any disparity between each of said number of said plurality of helper threads completing sweeps of selections of said total number of sections is reduced.

2. The method according to claim 1 for efficiently distributing a memory heap, further comprising:
   monitoring a disparity between completion times of said plurality of helper threads sweeping said first number of sections and said second number of sections;
   comparing said disparity between completion times with a completion threshold range;
   responsive to said disparity between completion times exceeding said completion threshold range, reducing a size of said first portion of said memory heap and redistributing said plurality of sections; and
   responsive to said disparity between completion times not exceeding said completion threshold range, increasing a size of said first portion of said memory heap and redistributing said plurality of sections.

3. The method according to claim 1 for efficiently distributing a memory heap, further comprising:
   allocating a separate data structure for each of said plurality of sections, wherein each said data structure comprises a local free list, a pointer to a start of a portion of said memory heap and a pointer to an end of a portion of said memory heap.

4. The method according to claim 3 for efficiently distributing a memory heap, wherein each said data structure further comprises a prefix value for indicating a number of initial consecutive zero bits and a suffix value for indicating a number of bits of a marked object extending beyond a section or indicating a number of consecutive zero bits following a marked object.

5. The method according to claim 1 for efficiently distributing a memory heap, further comprising:
   only allocating objects greater than a threshold size within said first portion of said memory heap.

6. The method according to claim 1 for efficiently distributing a memory heap, further comprising:
   responsive to initiating a sweep, scanning each of said plurality of sections with one from among a plurality of helper threads, wherein each of said helper threads is enabled to detect runs of zeros in a bitwise vector indicating a potentially large marked object and fetch the size of the potentially large marked object to determine if a remainder of bits representing said potentially large marked object can be skipped.

7. A system for efficiently distributing a memory heap among a plurality of sections, comprising:
   means for distributing a first portion of a memory heap among a first number of sections from among a plurality of sections, wherein said first number of sections correspond to a number of a plurality of helper threads allocable for bitwise sweeping of said memory heap during garbage collection; and
   means for distributing a second portion of said memory heap among a second number of sections from among said plurality of sections, wherein a size of said memory heap distributed among each of said second number of sections progressively decreases, such that a total number of sections within said memory heap is minimized and any disparity between each of said number of said plurality of helper threads completing sweeps of selections of said total number of sections is reduced.

8. The system according to claim 7 for efficiently distributing a memory heap, further comprising:
   means for monitoring a disparity between completion times of said plurality of helper threads sweeping said first number of sections and said second number of sections;
   means for comparing said disparity between completion times with a completion threshold range;
   means, responsive to said disparity between completion times exceeding said completion threshold range, for reducing a size of said first portion of said memory heap and redistributing said plurality of sections; and
   means, responsive to said disparity between completion times not exceeding said completion threshold range, for increasing a size of said first portion of said memory heap and redistributing said plurality of sections.

9. The system according to claim 7 for efficiently distributing a memory heap, further comprising:

means for allocating a separate data structure for each of said plurality of sections, wherein each said data structure comprises a local free list, a pointer to a start of a portion of said memory heap and a pointer to an end of a portion of said memory heap.

10. The system according to claim 9 for efficiently distributing a memory heap, wherein each said data structure further comprises a prefix value for indicating a number of initial consecutive zero bits and a suffix value for indicating a number of bits of a marked object extending beyond a section or indicating a number of consecutive zero bits following a marked object.

11. The system according to claim 7 for efficiently distributing a memory heap, further comprising:

means for only allocating objects greater than a threshold size within said first portion of said memory heap.

12. The system according to claim 7 for efficiently distributing a memory heap, further comprising:

means, responsive to initiating a sweep, for scanning each of said plurality of sections with one from among a plurality of helper threads, wherein each of said helper threads is enabled to detect runs of zeros in a bitwise vector indicating a potentially large marked object and fetch the size of the potentially large marked object to determine if a remainder of bits representing said potentially large marked object can be skipped.

13. A computer program product, residing on a computer—readable volatile or non-volatile—medium, for efficiently distributing a memory heap among a plurality of sections, comprising:

means for distributing a first portion of a memory heap among a first number of sections from among a plurality of sections, wherein said first number of sections correspond to a number of a plurality of helper threads allocable for bitwise sweeping of said memory heap during garbage collection; and means for distributing a second portion of said memory heap among a second number of sections from among said plurality of sections, wherein a size of said memory heap distributed among each of said second number of sections progressively decreases, such that a total number of sections within said memory heap is minimized and any disparity between each of said number of said plurality of helper threads completing sweeps of selections of said total number of sections is reduced.

14. The computer program product according to claim 13 for efficiently distributing a memory heap, further comprising:

means for monitoring a disparity between completion times of said plurality of helper threads sweeping said first number of sections and said second number of sections;

means for comparing said disparity between completion times with a completion threshold range;

means, responsive to said disparity between completion times exceeding said completion threshold range, for reducing a size of said first portion of said memory heap and redistributing said plurality of sections; and means, responsive to said disparity between completion times not exceeding said completion threshold range, for increasing a size of said first portion of said memory heap and redistributing said plurality of sections.

15. The computer program product according to claim 13 for efficiently distributing a memory heap, further comprising:

means for allocating a separate data structure for each of said plurality of sections, wherein each said data structure comprises a local free list, a pointer to a start of a portion of said memory heap and a pointer to an end of a portion of said memory heap.

16. The computer program product according to claim 13 for efficiently distributing a memory heap, further comprising:

means for only allocating objects greater than a threshold size within said first portion of said memory heap.

17. The computer program product according to claim 13 for efficiently distributing a memory heap, further comprising:

means, responsive to initiating a sweep, for scanning each of said plurality of sections with one from among a plurality of helper threads, wherein each of said helper threads is enabled to detect runs of zeros in a bitwise vector indicating a potentially large marked object and fetch the size of the potentially large marked object to determine if a remainder of bits representing said potentially large marked object can be skipped.

* * * * *